United States Patent
Tsai et al.

(10) Patent No.: US 9,986,200 B1
(45) Date of Patent: May 29, 2018

(54) METHOD AND VIDEO CONVERSION SYSTEM OF UPDATING VIDEO SETTING

(71) Applicant: NOVATEK Microelectronics Corp., Hsin-Chu (TW)

(72) Inventors: Wan-Ching Tsai, Taipei (TW); Chih-Chia Kuo, Hsinchu County (TW); Shih-Sung Wen, Hsinchu County (TW); Fu-Sheng Liang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days. days.

(21) Appl. No.: 15/592,214

(22) Filed: May 11, 2017

(51) Int. Cl.
*H04N 7/01* (2006.01)
*H04N 9/64* (2006.01)
*H04N 7/08* (2006.01)

(52) U.S. Cl.
CPC ............... *H04N 7/01* (2013.01); *H04N 7/08* (2013.01); *H04N 9/642* (2013.01)

(58) Field of Classification Search
CPC ................................................ H04N 19/98
USPC ............... 348/441, 687; 375/240.1, 240.25; 386/328, 254, 300
See application file for complete search history.

(56) References Cited

U.S. PATENT DOCUMENTS

| | | | | |
|---|---|---|---|---|
| 4,933,761 A | * | 6/1990 | Murakami | G06T 9/008 375/240.22 |
| 5,826,073 A | * | 10/1998 | Ben-Meir | G06F 9/30149 712/226 |
| 6,571,363 B1 | * | 5/2003 | Steiss | G06F 11/1497 712/227 |
| 8,380,946 B2 | * | 2/2013 | Hetzler | G11C 16/349 711/156 |
| 2009/0063772 A1 | * | 3/2009 | Magoshi | G06F 12/0811 711/122 |
| 2009/0245749 A1 | * | 10/2009 | Ueda | G11B 27/02 386/328 |
| 2010/0262792 A1 | * | 10/2010 | Hetzler | G06F 11/008 711/156 |
| 2014/0079113 A1 | * | 3/2014 | Newton | G09G 5/006 375/240.01 |
| 2016/0150180 A1 | * | 5/2016 | Kozuka | H04N 5/913 386/254 |
| 2016/0191883 A1 | * | 6/2016 | Uchimura | G11B 20/10 386/300 |
| 2016/0241829 A1 | * | 8/2016 | Qu | G09G 5/006 |
| 2016/0309154 A1 | * | 10/2016 | Rusanovskyy | H04N 19/159 |
| 2016/0360213 A1 | * | 12/2016 | Lee | H04N 19/186 |
| 2016/0373712 A1 | * | 12/2016 | Yamamoto | G11B 20/10 |
| 2017/0070701 A1 | * | 3/2017 | Nakajima | H04N 21/436 |
| 2017/0085878 A1 | * | 3/2017 | Sole Rojals | H04N 19/124 |
| 2017/0092280 A1 | * | 3/2017 | Hirabayashi | G10L 19/008 |
| 2017/0105042 A1 | * | 4/2017 | Toma | H04N 21/43622 |

* cited by examiner

*Primary Examiner* — Paulos M Natnael
(74) *Attorney, Agent, or Firm* — Winston Hsu

(57) ABSTRACT

A switching method of video setting for a video conversion system includes generating a static metadata change flag when a static metadata change event is detected, repeating an output video after the static metadata change flag is generated, updating a video setting according to a static metadata corresponding to an input video when the output video is repeated, and converting the input video into the output video according to the video setting to display the output video.

12 Claims, 3 Drawing Sheets

METHOD AND VIDEO CONVERSION SYSTEM OF UPDATING VIDEO SETTING

BACKGROUND OF THE INVENTION

1. Field of the Invention

The present invention relates to a method and video conversion system, and more particularly, to a method and video conversion system of updating video setting to achieve seamless switching.

2. Description of the Prior Art

High dynamic range (HDR) television standards have been and continue to be formulated for every aspect of HDR content creation, transport, delivery, and display. The Society of Motion Picture and Television Engineers (SMPTE) has developed standards relating to some aspects of HDR. High-Definition Multimedia Interface 2.0 (HDMI 2.0) is a proprietary audio/video interface for transmitting video/audio data from an HDMI-compliant source device (e.g., a display controller) to a compatible display device (e.g., a computer monitor, a video projector, a digital television, or a digital audio device).

Considering an HDR TV with HDMI input source, an HDMI player (e.g., setup box) may be switched to menu environment or a new video which has new static metadata different from current static metadata corresponding to a video currently displaying. It takes a moment for an HDR conversion unit of the HDR TV to update and apply a new video setting corresponding to the new static metadata, and the new video displayed by the HDR TV may appear wrong luminance and wrong color within the moment due to mismatch between the video setting and the video.

To avoid displaying the video with wrong luminance and wrong color, the HDR TV displays a black mask during the video setting change. When the HDR TV detects that the static metadata changes, the HDR TV displays a few black frames until the HDR conversion unit of the HDR TV has updated to the new video setting. However, showing the black mask may influence user experience.

Therefore, how to seamlessly switch to new video settings on the HDMI player to improve user experience has become a topic in the industry.

SUMMARY OF THE INVENTION

It is therefore an objective of the present invention to provide a method and video conversion system of updating video setting to achieve seamless switching.

The present invention discloses a method of updating video setting for a video conversion system. The method includes generating a static metadata change flag when a static metadata change event is detected, repeating an output video after the static metadata change flag is generated, updating a video setting according to a static metadata corresponding to an input video when the output video is repeated, and converting the input video into the output video according to the video setting to display the output video.

The present invention further discloses a video conversion system. The video conversion system includes a video receiver, a static metadata detector, a frame buffer, a video setting configuration unit, a video conversion unit and a display panel. The video receiver is configured to receive an input video and a static metadata corresponding to the input video. The static metadata detector is coupled to the video receiver, and configured to generate a static metadata change flag when a static metadata change event is detected. The frame buffer is coupled to the static metadata detector, and configured to repeat an output video after the static metadata change flag is generated. The video setting configuration unit is coupled to the video receiver, and configured to update a video setting according to the static metadata corresponding to the input video when the output video is repeated. The video conversion unit is coupled to the video receiver, the video setting configuration unit and the frame buffer, and configured to convert the input video into the output video according to the video setting. The display panel is coupled to the frame buffer, and configured to display the output video.

The present invention utilizes the static metadata detector to detect a static metadata change event, the frame buffer repeats the video currently displaying when the static metadata change event is detected, and the video setting configuration unit updates the video setting when the current video is repeated. Until the video setting has been updated and applied, the display panel gets the output video frame with correct HDR video setting. As a result, seamless switching is achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
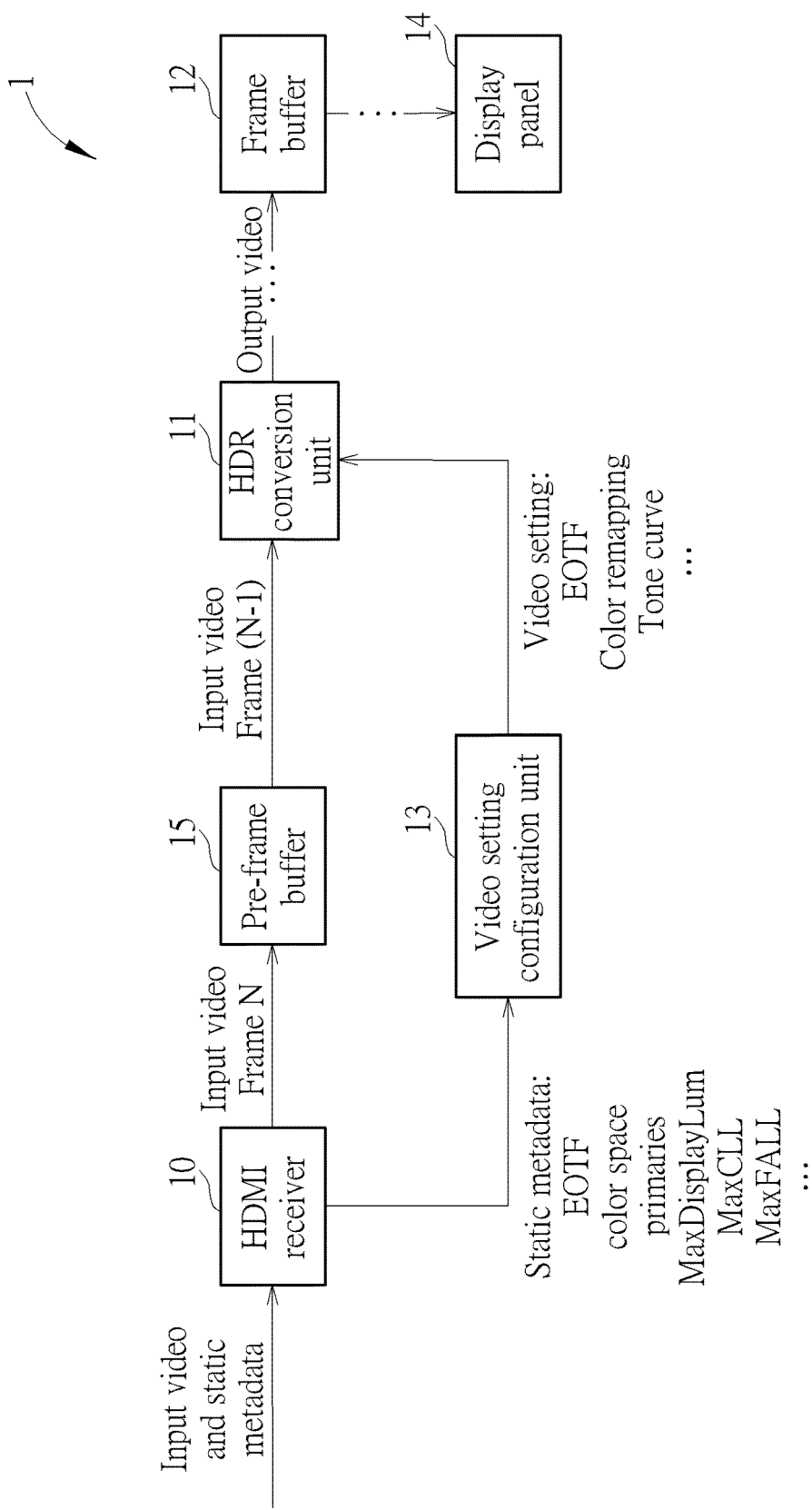
FIG. 1 is a functional block diagram of a video conversion system 1.

FIG. 1 is a functional block diagram of a video conversion system 1. The video conversion system 1 is used for converting video/audio data received from a High-Definition Multimedia Interface (HDMI) into high dynamic range (HDR) or standard dynamic range (SDR) video/audio. The video conversion system 1 includes an HDMI receiver 10, an HDR conversion unit 11, a frame buffer 12, a video setting configuration unit 13, a display panel 14, and a pre-frame buffer 15.

The HDMI receiver 10 is coupled to the video setting configuration unit 13 and the pre-frame buffer 15, and configured to receive an input package from an HDMI interface. The input package includes an input video and static metadata corresponding to the input video, wherein the input video includes a plurality of input frames, and frame N denotes one of the plurality of input frames. The HDMI receiver 10 is further configured to separate the plurality of input frames of the input video and static metadata corresponding to the input video from the input package, so as to transmit the input video frame by frame to the pre-frame buffer 15, and transmit the static metadata to the video setting configuration unit 13.

The HDR conversion unit 11 is coupled to the frame buffer 12, between the video setting configuration unit 13 and the pre-frame buffer 15, and configured to convert the input frame (N−1) into an output frame (N−1) according to a video setting corresponding to the static metadata. The video setting indicates at least one of display capabilities of the display panel 14, such as an electro-optical transfer function (EOTF), a tone curve, a color remapping, and so on.

The frame buffer 12 is coupled between the HDR conversion unit 11 and the display panel 14, and configured to delay the output video frame by frame. In one embodiment, there is a perceptual quantization (PQ) unit coupled between the frame buffer 12 and the display panel 14, and configured to perform an EOTF to adapt to certain display capabilities, e.g., luminance level up to 10000 cd/m$^2$, and ITU-R Recommendation BT.2020 (abbreviated Rec. 2020) color space.

The video setting configuration unit 13 is coupled to the HDMI receiver 10 and the HDR conversion unit 11, and configured to generate the video setting corresponding to the static metadata. The static metadata indicates at least one of display capabilities of the display panel 14, such as an EOTF, color space primaries, a display maximum luminance (abbreviated MaxDisplayLum), a maximum content light level (abbreviated MaxCLL), a maximum frame-average light level (abbreviated MaxFALL), and so on. For flexibility, the video setting configuration unit 13 may be realized by a software program to dynamically compute Tone Curve and related HDR video setting base on the received static metadata. Thus, there would be a video frame buffer or line buffer (e.g., the pre-frame buffer 15) to earn a frame time or few lines times for the software program to do the computation, i.e., update and apply the video setting corresponding to the static metadata.

The pre-frame buffer 15 is coupled to the HDMI receiver 10 and the HDR conversion unit 11, and configured to delay the input video frame by frame, which earns enough time (e.g., a frame time or few lines times) for the video setting configuration unit 13 to update and apply the video setting corresponding to the received static metadata. For example, if the static metadata change is detected by the video setting configuration unit 13, the video setting configuration unit 13 updates the video setting corresponding to the new static metadata, so as to output the updated video setting to the HDR conversion unit 11 during the frame time of the pre-frame buffer 15. Therefore, the HDR conversion unit 11 converts the input frame (N−1) into the output frame (N−1) according to the updated video setting. In such a situation, a black mask during static video setting update may be avoided to achieve seamless switching.

The display panel 14 is coupled to the frame buffer 12, and configured to display the output video frame by frame based on the video setting corresponding to the output video. With the enough time for the video setting configuration unit 13 to update the proper video setting corresponding to the static metadata, the display panel 14 is capable of displaying proper luminance and color corresponding to the output video, so as to reach better perceived experience and achieve seamless switching.

Figure 2:
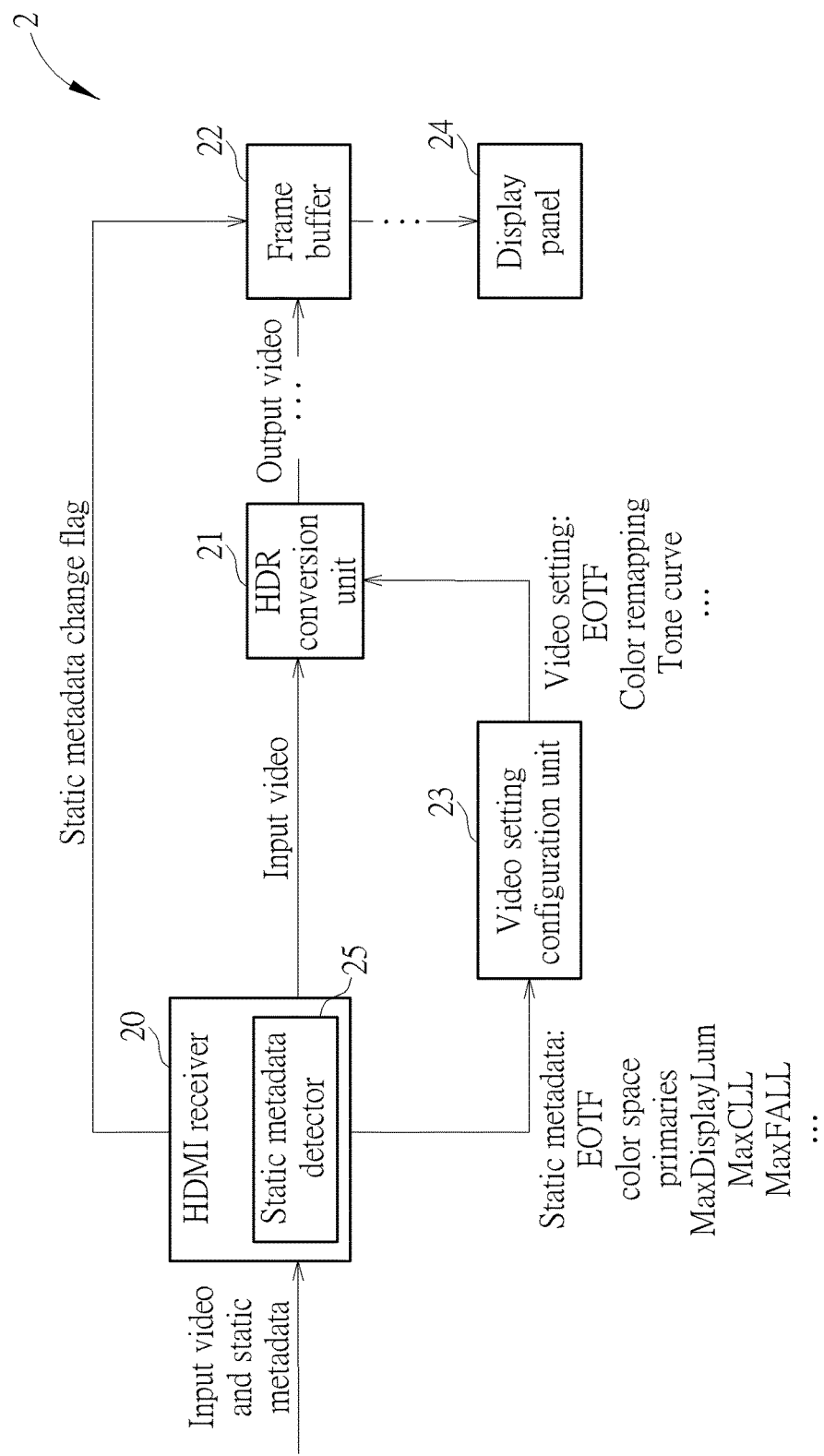
FIG. 2 is a functional block diagram of a video conversion system 2 according to an embodiment of the present invention.

FIG. 2 is a functional block diagram of a video conversion system 2 according to an embodiment of the present invention. The video conversion system 2 is used for converting video/audio data from HDMI into HDR or SDR video/audio. The video conversion system 2 includes an HDMI receiver 20, an HDR conversion unit 21, a frame buffer 22, a video setting configuration unit 23, the display panel 14, and a static metadata detector 25.

The HDMI receiver 20 is coupled to the HDR conversion unit 21, the frame buffer 22 and the video setting configuration unit 23, and configured to receive an input package from an HDMI interface. The input package includes an input video and static metadata corresponding to the input video, wherein the input video includes a plurality of input frames. The HDMI receiver 20 is further configured to separate the plurality of input frames of the input video and the static metadata corresponding to the input video from the input package, so as to transmit the input video frame by frame to the HDR conversion unit 21, and transmit the static metadata corresponding to the input video to the video setting configuration unit 23.

The HDR conversion unit 21 is coupled between the HDMI receiver 20, the frame buffer 22 and the video setting configuration unit 23, and configured to convert the input video frame by frame according to the video setting generated by the video setting configuration unit 23.

The frame buffer 22 is coupled between the HDR conversion unit 21, the static metadata detector 25 and the display panel 14, and configured to delay the output video frame by frame. In one embodiment, the frame buffer 22 may be any hardware or software unit with the functionality of frame buffering and existed between the HDR conversion unit 21 and the display panel 14.

Noticeably, the static metadata detector 25 is a hardware detecting circuit integrated with the HDMI receiver 20, for continuously detecting a static metadata change event at a front end of the video conversion system 2. The static metadata change event indicates that the static metadata corresponding to the input video is different from a static metadata corresponding to the output video.

The static metadata detector 25 is coupled to the frame buffer 22 and the video setting configuration unit 23, and configured to generate a static metadata change flag to disable writing operation to the frame buffer 22 if the static metadata change event is detected. Writing operation to the frame buffer 22 is disabled, so the frame buffer 22 repeats the output video that is currently displaying if the static metadata change flag is received. Meanwhile, the display panel 14 appears still for a moment when the frame buffer 22 repeats the output video that is currently displaying. Until the video setting configuration unit 23 has updated and applied the newest video setting to the HDR conversion unit 21, the static metadata detector 25 releases the metadata change flag from the frame buffer 22, and the display panel 14 gets new video frame with correct HDR video setting. As a result, seamless switching is achieved.

For example, the static metadata detector 25 sends the metadata change flag (e.g., one-bit signal with a high voltage level or a rising edge) to the frame buffer 22 before the video setting has been updated. The frame buffer 22 repeats the current video frame if the metadata change flag with the high voltage level is received. In one embodiment, the frame buffer 22 outputs identical video frame(s) with the video frame that is currently displaying when the metadata change flag with the high voltage level is received. Then, the display panel 14 repeats displaying the video frame(s) that is currently displaying. Until the video setting configuration unit 23 has updated and applied the newest video setting to the HDR conversion unit 21, the static metadata detector 25 resets the metadata change flag (e.g., one-bit signal with a low voltage level or a falling edge) to the frame buffer 22 after the video setting has been updated, so as to enable writing operation to the frame buffer 22. The display panel 14 gets new video frame with correct HDR video setting. As a result, seamless switching is achieved.

In one embodiment, the video setting configuration unit 23 generates a metadata update flag to at least one of the static metadata detector 25 and the frame buffer 22 to notify that the newest video setting has been updated and applied.

Note that, the static metadata detector 25 is a hardware detecting circuit, while the video setting configuration units 23 and 13 are software processing units. In general, the software processing unit requires more time than that of the hardware detecting circuit to detect the static metadata change. Specifically, the software processing unit performs software decoding and computation to detect the static metadata change, while the hardware detecting circuit detects electric characteristics of at least one data bit of the static metadata, such as detecting a rising edge or a falling edge of at least one data bit, or a voltage level change of at least one data bit. Therefore, using the hardware static metadata detector 25 to detect the static metadata change has an advantage of fast respond than using software detection.

Further, the pre-frame buffer 15 (or a line buffer) requires a larger hardware area than that of the static metadata detector 25. Therefore, using the hardware static metadata detector 25 to detect the static metadata change has an advantage of lower cost than the cost of a frame buffer.

Figure 3:
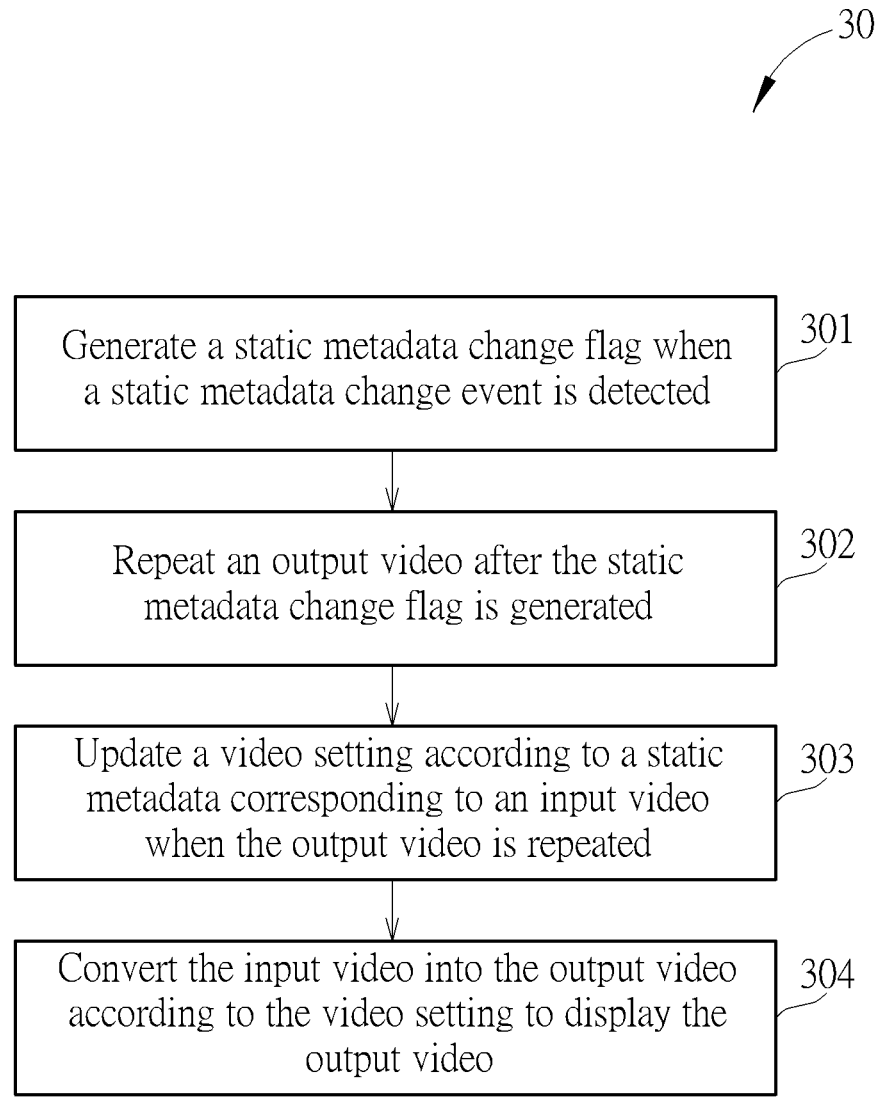
FIG. 3 is a flowchart of a process of updating video setting according to an embodiment of the present invention.

Operations of the video conversion system 2 may be summarized into a process 30 of updating video setting, as shown in FIG. 3. The process 30 includes the following steps.

Step 301: Generate a static metadata change flag when a static metadata change event is detected.
Step 302: Repeat an output video after the static metadata change flag is generated.
Step 303: Update a video setting according to a static metadata corresponding to an input video when the output video is repeated.
Step 304: Convert the input video into the output video according to the video setting to display the output video.

In the process 30, Step 301 is performed by the static metadata detector 25, Step 302 is performed by the frame buffer 22, Step 303 is performed by the video setting configuration unit 23, and Step 304 is performed by the HDR conversion unit 21 and the display panel 14. In one embodiment, the frame buffer 22 may perform Step 302 by outputting an identical video frame with the video frame that is currently displaying when the writing operation to the frame buffer 22 is disabled. Detailed descriptions of the process 30 can be obtained by referring to the embodiment of FIG. 2.

To sum up, the present invention utilizes the static metadata detector to detect a static metadata change event, the frame buffer after the HDR conversion unit is disabled from writing operation to repeat the video currently displaying if the static metadata change event is detected, and the video setting configuration unit updates the video setting when the writing operation to the frame buffer 22 is disabled. Until the video setting has been updated and applied, the display panel gets new video frame with correct HDR video setting. As a result, seamless switching is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of updating video setting for a video conversion system, comprising:
generating a static metadata change flag by a static metadata detector when a static metadata change event is detected;
disabling writing operation to a frame buffer of the video conversion system after the static metadata change flag is generated;
updating a video setting according to a static metadata corresponding to an input video;
generating a metadata update flag to at least one of the static metadata detector and the frame buffer to notify that the video setting corresponding to the input video has been updated; and
converting the input video into the output video according to the video setting.

2. The method of claim 1, wherein disabling writing operation to the frame buffer of the video conversion system after the static metadata change flag is generated comprises:
outputting at least one frame identical with an output frame of the output video that is currently displaying.

3. The method of claim 1, wherein the static metadata change event indicates that the static metadata corresponding to the input video is different from a static metadata corresponding to the output video.

4. The method of claim 1, wherein the static metadata change flag is a one-bit signal with a high voltage level or a rising edge before the video setting has been updated, and the static metadata change flag is a one-bit signal with a low voltage level or a falling edge after the video setting has been updated.

5. The switching method of claim 1, wherein the video conversion system is used for converting a video package received from a High-Definition Multimedia Interface into a high dynamic range video or a standard dynamic range video.

6. A video conversion system, comprising:
a video receiver configured to receive an input video and a static metadata corresponding to the input video;
a static metadata detector coupled to the video receiver, and configured to generate a static metadata change flag when a static metadata change event is detected;
a frame buffer coupled to the static metadata detector, and configured to disable writing operation after the static metadata change flag is generated;
a video setting configuration unit coupled to the video receiver, and configured to update a video setting according to the static metadata corresponding to the input video; and
a video conversion unit coupled to the video receiver, the video setting configuration unit and the frame buffer, and configured to convert the input video into the output video according to the video setting;
wherein the video setting configuration unit is further configured to generate a metadata update flag to at least one of the static metadata detector and the frame buffer to notify that the video setting corresponding to the input video has been updated.

7. The video conversion system of claim 6, wherein the frame buffer is further configured to output at least one frame identical with an output frame of the output video that is currently displaying when writing operation to the frame buffer is disabled.

8. The video conversion system of claim 6, wherein the static metadata change event indicates that the static metadata corresponding to the input video is different from a static metadata corresponding to the output video.

9. The video conversion system of claim 6, wherein the static metadata change flag is a one-bit signal with a high voltage level or a rising edge before the video setting has been updated, and the static metadata change flag is a one-bit signal with a low voltage level or a falling edge after the video setting has been updated.

10. The video conversion system of claim 6, wherein the video conversion system is used for converting a video package received from a High-Definition Multimedia Interface into a high dynamic range video or a standard dynamic range video.

11. The video conversion system of claim 6, wherein the static metadata detector is a hardware detecting circuit integrated with the video receiver.

12. The video conversion system of claim 6, wherein the frame buffer is a hardware or software unit configured to delay the output video frame by frame and existed between the video conversion unit and a display panel.

* * * * *